United States Patent [19]

Bridges

[11] E Re. 30,962

[45] Reissued Jun. 8, 1982

[54] INSULATED TRAYS FOR FOOD OR THE LIKE

[75] Inventor: John A. Bridges, Nashville, Tenn.

[73] Assignee: Aladdin Industries, Incorporated, Nashville, Tenn.

[21] Appl. No.: 59,396

[22] Filed: Jul. 20, 1979

Related U.S. Patent Documents

Reissue of:

[64] Patent No.: 3,532,247
Issued: Oct. 6, 1970
Appl. No.: 837,979
Filed: Apr. 28, 1969

U.S. Applications:

[63] Continuation of Ser. No. 690,654, Dec. 14, 1967, abandoned, which is a continuation-in-part of Ser. No. 672,219, Mar. 30, 1967, abandoned.

[51] Int. Cl.[3] ..... B65D 1/26; B65D 21/04

[52] U.S. Cl. ..... 220/23.6; D7/38; 206/217; 206/503; 206/509; 206/545; 206/558; 206/564; 220/444; 220/902; 229/2.5 R

[58] Field of Search ..... 206/503, 509, 541, 545, 206/499; 220/23.6, 23.8, 23.83, 23.86, 401, 412, 444, 902; 229/2.5 R

[56] References Cited

U.S. PATENT DOCUMENTS

| | | | |
|---|---|---|---|
| 1,336,776 | 4/1920 | Drinkwater . | |
| 2,436,097 | 2/1928 | Clarke . | |
| 2,623,656 | 12/1952 | Rottau . | |
| 2,641,912 | 6/1953 | Lawler . | |
| 2,672,697 | 3/1954 | LaTour . | |
| 2,886,225 | 5/1959 | Clarke . | |
| 3,016,129 | 1/1962 | King . | |
| 3,113,710 | 12/1963 | Meagher . | |
| 3,120,570 | 2/1964 | Kennedy . | |
| 3,122,265 | 2/1964 | Innis | 220/23.6 X |
| 3,295,737 | 1/1967 | Page et al. . | |

FOREIGN PATENT DOCUMENTS

| | | |
|---|---|---|
| 1253289 | 1/1961 | France . |
| 1408476 | 7/1965 | France . |
| 811615 | 4/1959 | United Kingdom . |
| 956167 | 4/1964 | United Kingdom . |
| 997615 | 7/1965 | United Kingdom . |
| 1060606 | 3/1967 | United Kingdom . |
| 1079953 | 8/1967 | United Kingdom . |
| 1089648 | 11/1967 | United Kingdom . |

*Primary Examiner*—George E. Lowrance
*Attorney, Agent, or Firm*—McDougall, Hersh & Scott

[57] ABSTRACT

An insulated tray for holding and serving food or the like, either directly on the tray or in receptacles supported on the tray. One embodiment comprises upper and lower cover members made of thin impervious material, preferably plastic sheet material, the space between said cover members being filled with insulating foam, preferably plastic foam, the edges of said cover members being joined around the periphery of the tray, the upper cover member being dished to form one or more receptacles for holding food or the like, the upper cover member being formed with a groove extending around one or more of the dished portions, the lower cover member being formed with a complementary tongue, whereby a plurality of the trays may be stacked with the tongue of one tray nesting in the groove of the underlying tray, the tongue and groove forming a seal around the dished portion. In another embodiment, the lower cover member is omitted. Another embodiment employs thin plastic receptacles as liners in the dished portions of the tray. Each liner has a bead shaped sealing flange which engages a sealing surface on the lower side of the tray above when the trays are stacked. In another embodiment, the tray is made of insulating resinous plastic foam. A skin or coating may be provided on all or a portion of the outside of the tray.

10 Claims, 14 Drawing Figures

FIG. 6
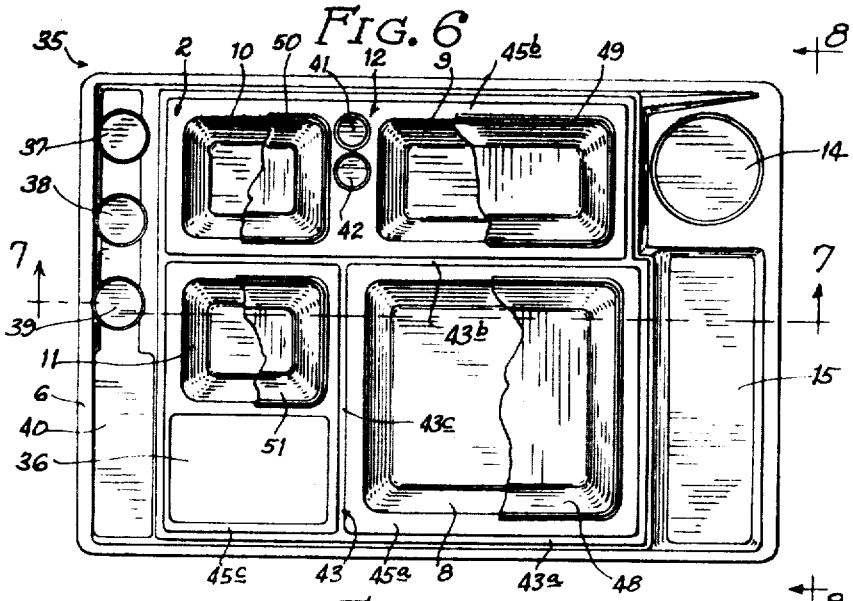
FIG. 7
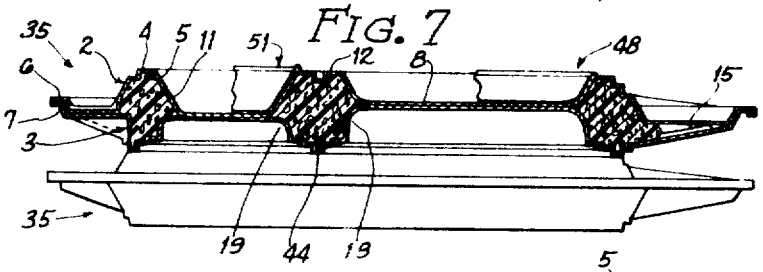
FIG. 8
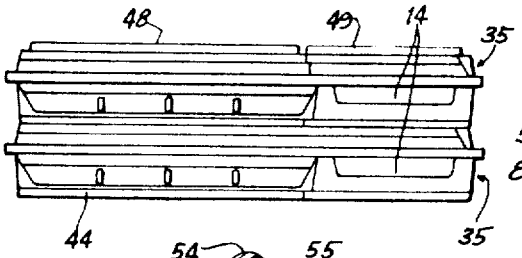
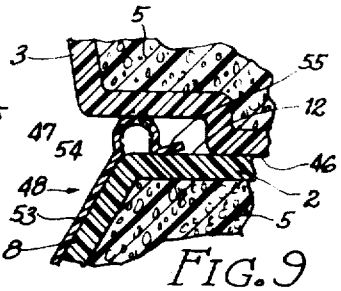
FIG. 9
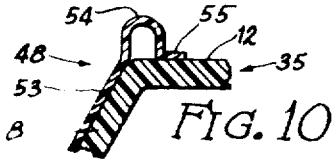
FIG. 10

INSULATED TRAYS FOR FOOD OR THE LIKE

Matter enclosed in heavy brackets [ ] appears in the original patent but forms no part of this reissue specification; matter printed in italics indicates the additions made by reissue.

This application is a continuation of my copending application Ser. No. 690,654, filed Dec. 14, 1967, now abandoned, which was a continuation-in-part of my copending application Ser. No. 672,219, filed Mar. 30, 1967, now abandoned.

This invention relates to insulated trays for holding and serving food or the like, either directly or in auxiliary receptacles or liners which are adapted to be supported on the tray.

The insulated trays of the present invention are well adapted to hold hot or cold foods which are prepared in advance and are to be served to airline passengers. Moreover, the food trays are well adapted for use in other situations, where it is desired to keep foods hot or cold. Thus, the insulated food trays are highly advantageous for use in hospitals, cafeterias, and institutions generally.

In addition, the present invention may be applied to insulated food and buffet trays for home use. Such trays are well adapted for keeping foods hot for service in the home.

One object of the present invention is to provide an insulated tray having an upwardly facing dished portion or receptacle therein. In one embodiment, the tray comprises insulating plastic foam between upper and lower cover members made of impervious plastic material. The dished portion is formed in the upper cover member and is adapted to receive hot or cold foods or the like, either directly or in auxiliary receptacles or liners.

In another embodiment, the tray is made of resinous plastic foam, which may be molded to the required shape. The foam may be employed with only its natural skin, or with an additional skin in the form of an impervious coating. Such coating may be applied to the entire outside of the tray, or to only a portion thereof. Thus, the coating may be applied to only the dished portions of the tray, or to only the upper side of the tray. A thin film of plastic sheet material may be employed as an alternative to the coating.

Rather than serving the food directly in the dished portions of the tray, the food may be served in liners or inserts which may be mounted in the dished portions. The liners are preferably disposable and are preferably made of thin impervious plastic material. Each liner is preferably formed with a sealing upper edge which is adapted to engage a sealing surface on the lower side of the tray above, when the trays are stacked. The sealing upper edge is preferably in the form of a bead shaped flange. The bead shaped flange is preferably formed with an outwardly projecting portion for engaging a sealing surface which extends around the dished portion on the upper side of the tray.

Nesting elements are preferably formed on the upper and lower sides of the trays so that they may be stacked securely. When the trays are stacked, each tray is covered by the overlying tray. The hot or cold food on the tray is insulated by its own tray and also the tray above. The nesting elements are preferably in the form of complementary flanges and recesses on the tray. These flanges and recesses also act as sealing members to improve the insulating value of the tray.

The insulated trays of the present invention are low in cost, light in weight, and highly serviceable. The trays are so low in cost that they may be treated as disposable items. However, if the trays are reused, they are easy to clean.

Further objects and advantages of the present invention will appear from the following description taken with the accompanying drawings, in which:

FIG. 2 is an elevational view of a stack of the trays shown in FIG. 1, the view being partly in section along the line 2—2 in FIG. 1 and partly in section along the line 2a—2a.

FIG. 6 is a plan view of another insulated food tray utilizing disposable liners or inserts to hold the food.

FIG. 7 is an elevational view, partly in section, along the line 7—7 in FIG. 6.

FIG. 8 is an elevational view, taken as indicated by line 8—8 in FIG. 6.

FIG. 9 is a fragmentary enlarged vertical section, showing the sealing engagement between one of the liners and the tray above.

FIG. 10 is a fragmentary vertical section, similar to FIG. 9, but with the overlying tray removed.

Figure 1:
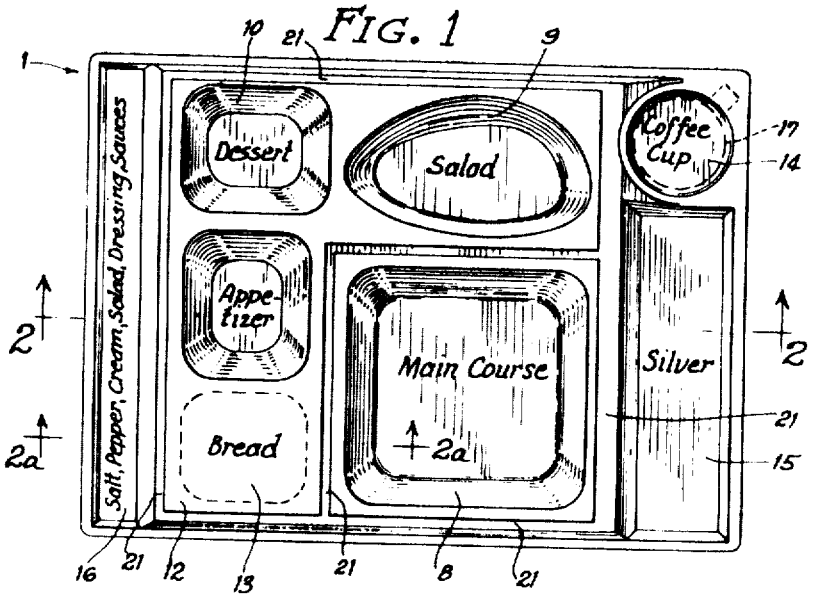
FIG. 1 is a top view of an insulated food tray to be described as an illustrative embodiment of the present invention.
Figure 2:
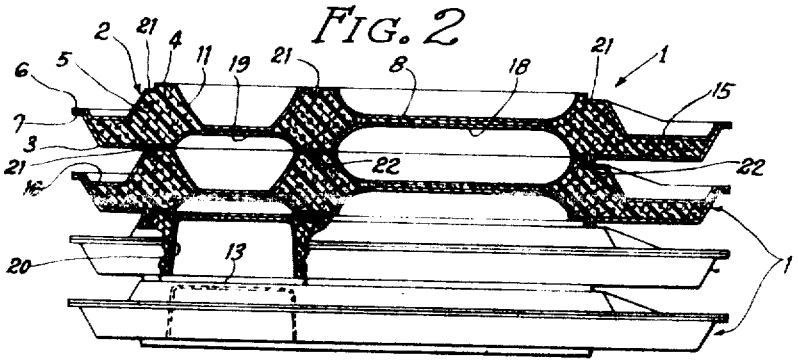

As already indicated, FIGS. 1 and 2 illustrate an insulated food tray 1, which is well adapted for serving meals to airline passengers. The food is prepared in advance and is placed on a plurality of the trays 1, which are then stacked for convenient handling and storage on the airplane. The insulated trays 1 are capable of keeping the various food courses hot or cold for an extended period so that the meals will still be highly appetizing after a sufficient lapse of time to allow the airplane to take off and reach its cruising altitude. The trays are also well suited for serving food in hospitals and other institutions.

Generally, the insulated tray 1 comprises an upper cover member or skin 2, and a lower cover member or skin 3, with a space 4 therebetween. The space 4 is partly or entirely filled with an insulating material 5, having a high heat insulating value. Preferably, the insulating material 5 is in the form of resinous plastic foam, such as polyurethane or polystyrene foam, for example. The insulating material may be foamed in place within the space 4, or may be introduced in some other manner into the space.

The impervious cover members 2 and 3 are preferably made of suitable resinous plastic materials, which will withstand heat, cold, moisture, and the various acids and other chemical agents which are commonly found in foods. For example, the cover members may be made of polypropylene, polyethylene, polycarbonate, or the like.

The upper and lower cover members 2 and 3 are formed with edge portions or flanges 6 and 7, which are joined together, preferably around the entire periphery of the tray 1. In this way, the space between the cover members 2 and 3 is sealed against the entry of moisture or any foreign material. The flanges 6 and 7 may be welded together by the application of heat and pressure, or may be joined together by solvent welding, or by the use of a suitable adhesive.

It will be seen that the joined flanges 6 and 7 project outwardly in a generally horizontal direction around the periphery of the tray. Thus, the tray may be handled very conveniently by gripping the flanges 6 and 7.

The upper cover member 2 is dished or depressed to form at least one receptacle for holding food or the like. In the illustrated construction, four such dished portions or receptacles 8, 9, 10, and 11 are formed in the upper cover member 2. Various food courses may be placed in the various dished portions. For example, the dished portion 8 may be employed to hold hot food for the main course. The salad, dessert, and appetizer may be placed in the dished portions 9, 10, and 11, respectively.

The dished portions 8, 9, 10, and 11 are depressed from an elevated main portion 12 which is located centrally on the tray. The elevated portion 12 comprises a flat area 13 which may be employed to hold bread or rolls.

Adjacent the side edges of the tray 1, the upper cover member 2 may be formed with additional depressed or dished portions 14, 15, and 16, which may be employed to hold various auxiliary items. Thus, the depressed portion 14 may be employed as a seat to hold and retain a coffee cup or other beverage receptacle 17, indicated in broken lines in FIG. 1. Accordingly, the depressed portion 14 is circular to accommodate the coffee cup or the like.

The depressed or dished portion 15 may be employed to hold table silver and a napkin, for example. The dished portion 16 is adapted to receive salt, pepper, cream, salad dressing, cocktail sauce, and the like.

It is preferred to form the lower cover member 3 with one or more complementary dished portions which are inverted and are positioned under the dished portions in the upper cover member 2. As shown in FIG. 2, the lower cover member 3 is formed with inverted dished portions 18 and 19, which are disposed under the dished portions 8 and 11. Similar inverted dished portions are also preferably provided under the dished portions 9 and 10. In addition, the lower cover member 3 is preferably formed with an inverted dished portion 20, which is disposed under the flat area 13 of the upper cover member 2.

As shown to best advantage in FIG. 2, the tray 1 is adapted to be stacked, when fully loaded with food, so that each tray is covered by the overlying tray in the stack. The inverted dished portions 18, 19, and 20 of each tray then complement and enclose the corresponding dished portions 8, 11, and 13 of the underlying tray. Thus, each portion of hot or cold food is supported by one tray and is covered and enclosed by the overlying tray. In this way, each portion of food is insulated on all sides so that the transfer of heat is minimized. Moreover, the loss of moisture is largely prevented.

In FIG. 2, the two uppermost trays in the stack are shown in section along the line 2—2 in FIG. 1. The third tray from the top is shown partly in section along the line 2a—2a. It will be seen that the inverted dished portion 20 is disposed over the flat area 13 on the underlying tray, so as to enclose and cover the bread or roll which is normally supported thereon.

It is preferred to provide tongue and groove elements on each tray, so arranged as to interlock when the trays are stacked, so that the trays will nest securely. Moreover, the tongue and groove elements preferably extend around at least one of the dished portions in the upper cover member 2, so as to form a seal which increases the insulating value of the trays, and also minimizes the loss of moisture.

In the illustrated construction, the upper cover member 2 is formed with a series of interconnected, upwardly facing grooves or recesses 21. It will be seen that the grooves 21 completely surround the dished portion 8 for the main course. In addition, the grooves 21 extend completely around the elevated main portion 12 of the cover member 2.

The lower cover member 3 is formed with a complete system of interconnected tongues or flanges 22 which correspond with the grooves 21. When the trays 1 are stacked, the tongues 22 of each tray, other than the lowermost tray, nest in the grooves 21 formed in the underlying tray. The tongues 22 on the lowermost trays act as pedestals and engage the horizontal supporting surface on which the stack of trays is mounted. By surrounding the main receptacle 8, the tongues 22 and the grooves 21 minimize the loss of heat from the main receptacle while also substantially preventing the loss of moisture. The other tongue and groove elements substantially prevent the loss of moisture from the other receptacles 9, 10, and 11, while also affording a high heat insulating value. By virtue of the tongues and grooves, the trays 1 nest securely so that a large number of trays may be stacked without hazard of toppling.

It may be helpful to summarize the operation and use of the insulated food trays 1. The various food courses are placed in the dished portions or receptacles 8–11 of each tray. A roll may be placed on the flat area 13, while a beverage cup, silver, and various condiments, sauces and the like, may be placed in the dished portions 14, 15 and 16. As the trays are loaded, they are stacked, so that each tray acts as a cover for the preceding tray. The entire stack of trays may be handled and placed on the airplane as a unit. By virtue of the insulating foam 5, between the impervious cover members 2 and 3, the trays have a high heat insulting value. Thus, the trays are capable of keeping hot foods hot, and cold foods cold, for a considerable period of time. The stacking of the trays adds greatly to the insulating value of the trays because each tray is covered by a similar tray. The hot and cold foods on each tray overlie the hot and cold foods on the underlying tray, so that the temperature gradients between adjacent trays are very low.

The trays may be employed very advantageously to serve complete meals to airline passengers. As the trays are served, the beverage cup 17 may be filled with coffee or the like. After the trays have been used, they may be cleaned very easily. The trays lend themselves very conveniently to the use of mechanical dishwashing equipment. The trays are also very advantageous for serving food in hospitals and other institutions.

Figure 3:
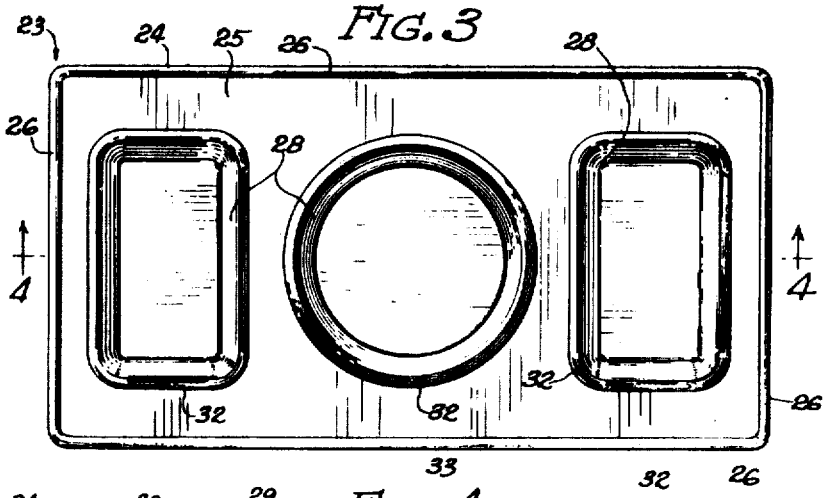
FIG. 3 is a top view of an insulated buffet tray, constituting a modified embodiment.
Figure 4:
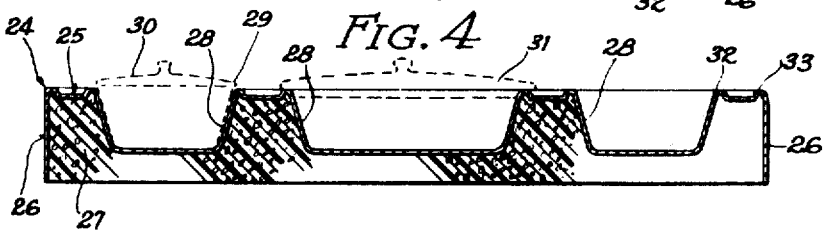
FIG. 4 is a vertical section taken generally along the line 4—4 in FIG. 3.
Figure 5:
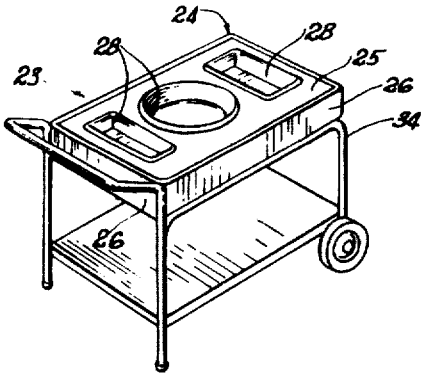
FIG. 5 is a perspective view showing the buffet tray on a buffet cart of a type adapted for home use.
Figure 11:
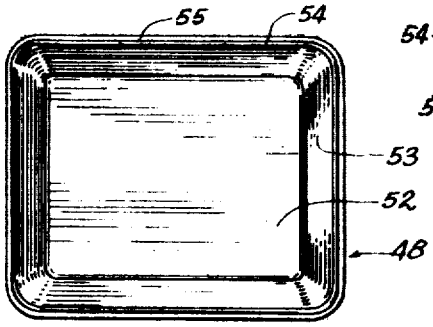
FIG. 11 is a plan view of one of the liners.
Figure 12:
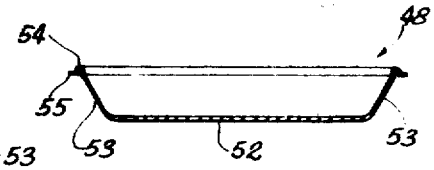
FIG. 12 is a vertical section through one of the liners.

FIGS. 3, 4, and 5 illustrate a modified tray 23, which is especially well adapted for use as a buffet tray in the home. As shown, the tray 23 comprises an upper cover member or skin 24 made of thin impervious material, preferably a suitable resinous plastic, as indicated in connection with the trays in FIGS. 1 and 2. However, in the case of the buffet tray 23 of FIGS. 1 to 5, the lower cover member is omitted. The upper cover member 24 is generally in the form of an inverted pan, having an upper wall 25 with side walls 26 projected downwardly therefrom. The space within the inverted pan is partly or entirely filled with a heat insulating material 27, preferably made of plastic foam, as previously indicated.

The upper cover member 24 is formed with one or more dished or depressed portions 28, forming receptacles adapted to hold food or the like, either directly or in auxiliary receptacles 29, such as casserole dishes or the like. The illustrated dished portion 29 is provided with a lid 30. One or more additional lids 31 may be provided to cover the other dished receptacles 28. The lids 31 may be mounted directly on the cover member 24 when the receptacles 28 are employed to hold food directly.

Upwardly projecting ridges 32 are preferably provided around the dished receptacles 28. The ridges 32 reinforce the cover member 24 and also serve as the supports for the lids 31. Another upwardly projecting ridge 33 is preferably provided around the entire periphery of the upper wall 25, to reinforce the cover member 24, and to prevent any spilled food from running off the top wall 25.

As indicated in FIG. 5, the insulated buffet tray 23 may be mounted very efficiently on a buffet cart 34, which may be of any suitable construction. The buffet tray 23 may be secured to the cart, or may be removably supported thereon.

It will be evident that hot food may be placed in the various receptacles 28 of the buffet tray 23, either directly or in casserole dishes or the like. The buffet tray may also be employed to hold foods which are to be kept cold. The tray has a high heat insulating value, and thus is capable of keeping hot foods hot, and cold foods cold, so that they will remain appetizing for a considerable period of time. Thus, the food for a meal may be prepared and served in a leisurely fashion, while hot and cold foods are maintained at appetizing temperatures.

FIGS. 6–12 illustrate another modified tray or device 35 for serving complete meals to airline passengers. The tray 35 is also well adapted for serving food in hospitals and other institutions.

To a great extent, the insulated food tray 35 is the same as the tray 1 shown in FIGS. 1 and 2. To avoid repetition of description, corresponding components are being identified by the same reference characters in FIGS. 6–q2, as employed in FIGS. 1 and 2, so that the description directed to FIGS. 1 and 2 may be applied to FIGS. 6–12. Thus, only the differentiating features of the tray 35 need be described in detail.

It will be seen from FIG. 6 that the top surface 12 of the tray 35 is formed with a portion 36, for holding bread, rolls or the like. The portion 36 differs from the corresponding portion 13 of the tray 1, in that the portion 36 is slightly depressed or dished below the level of the top surface 12.

In the tray 35 of FIGS. 6 and 7, the depressed portion 16 is replaced with a more elaborate arrangement. Thus, the tray 35 is formed with a plurality of depressed or dished portions 37, 38, 39 and 40, disposed along one side of the tray. The dished portions 37, 38, and 39 are in the form of circular wells, adapted to retain small cups or other containers for holding cream, cocktail sauce, salad dressing, or other similar items. The dished portion 40 is rectangular in shape and may be employed to retain a small pack of cigarettes. It will be seen that additional dished portions 41 and 42 are formed in the top surface 12. The illustrated portions 41 and 42 are in the form of circular wells, adapted to retain small containers for salt and pepper. It will be understood that the detailed arrangement of the dished portions 37–42 is subject to wide variation, to suit varying needs.

Somewhat as before, the top surface 12 of the tray 35 is interrupted by a network of interconnected grooves or recesses 43 which are similar to the recess 21 of FIG. 1. It will be seen that the recesses 43 comprise border portions 43a which surround the five main dished portions 8–11 and 36. The illustrated recesses 43 also comprise a transverse portion 43b which isolates the dished portions 9 and 10 from the dished portions 8, 11 and 36. Another transverse portion 43c isolates the dished portion 8 from the dished portions 11 and 36. Thus, the dished portion 8 is completely isolated by the grooves 43a, 43b and 43c.

The lower side of the tray 35 is formed with tongues or flanges 44, corresponding to the recesses 43. When the trays are stacked, the flanges 44 nest into the recesses 43, so that a large number of trays may be stacked, with complete stability.

The interlocking recesses and flanges 43 and 44 enclose and seal the dished portions 8–11 and 36, so that all of the dished portions are isolated from the surrounding atmosphere. Thus, the passage of heat and moisture is minimized in both directions between the atmosphere and the dished portions 8–11 and 36.

The interlocking recesses 43 and flanges 44 also divide each tray 35 into three distinct zones which are isolated from one another. One zone comprises the dished portion 8, which is normally employed to hold hot foods. Thus, the loss of heat from this zone is minimized. The second zone comprises the dished portions 9 and 10 which are normally employed to hold chilled foods, such as a salad and dessert. Thus, the entry of heat into this zone is minimized. The third zone comprises the dished portions 11 and 36 which are normally employed to hold an appetizer and a roll. Depending upon the specific nature of the appetizer, this zone can be maintained at either an elevated or a chilled temperature. The provision of a plurality of isolated zones on the tray makes it possible to maintain different foods at different temperatures, so that both hot and cold foods will be served in a highly appetizing manner. Thus, the tray provides a high degree of flexibility in the serving of various hot and cold foods.

Within the three zones, the top surface 12 has three isolated portions 45a, 45b and 45c which provide sealing surfaces extending around the dished portions 8–11 and 36. Corresponding sealing surfaces 46 face downwardly on the lower side of the tray 35. When the trays 35 are stacked, the sealing surfaces 45a, 45b and 45c on each tray are adapted to be engaged by the sealing surfaces 46 on the tray above.

As shown in FIGS. 7 and 8, the lower side of the tray 35 is formed with additional sealing surfaces 47, which are stepped upwardly from the sealing surfaces 46. The purpose of the additional sealing surfaces 47 will become evident presently.

The dished portions 8–11 of the tray 35 may be employed to hold various foods either directly or in receptacles. The illustrated tray 35 employs such receptacles in the form of dishes or liners 48, 49, 50, and 51, adapted to fit closely within the dished portions 8–11. The liners 48–51 are preferably made of thin impervious material, capable of retaining the food products. For example, the liners 48–51 may be made of thin resinous plastic materials, such as polystyrene, polyethylene, polypropylene or the like. The liners are preferably treated as single service, disposable items. It is economically feasible to discard the liners after a single use, because the liners can be produced at extremely low cost. It will be understood that the use of the liners greatly facilitates the cleaning of the tray 35 for reuse.

Each of the illustrated liners 48–51 is made in one piece, with a bottom wall 52 and a plurality of side walls 53. The walls 52 and 53 will be extremely thin, because the liners do not need to be self-supporting. The tray 35 provides adequate support for the liners. The illustrated liners are rectangular in shape, but they may be of any desired shape.

At its upper edge, each of the illustrated liners 48–51 is preferably formed with a sealing flange or lip 54. As shown, the sealing flange 54 is bead shaped, in that it curves upwardly, outwardly and then downwardly. The illustrated flange 54 has a flat terminal portion or leg 55 which projects outwardly, generally in a horizontal direction.

FIG. 10 is an enlarged section, showing the engagement between the flange 54 and the tray 35. It will be seen that the bead shaped flange 54 projects above the top surface 12 of the tray 35. The flat terminal portion 55 of the flange 54 engages the top surface 12 and forms a seal which prevents the entry of food between the tray 35 and the liner.

As shown to best advantage in FIG. 9, the bead shaped flange 54 on each liner is adapted to be engaged by the corresponding sealing surface 47 on the lower side of the tray above. Preferably, the bead shaped flange 54 projects upwardly to such an extent that it is compressed by the weight of the tray above. The bead shaped flange 54 is thin and flexible so that such compression may readily occur, as shown in FIG. 9. The compression of the flange 54 insures that a tight seal will be formed between the flange 54 and the sealing surface 47 of the tray above. The compression of the flange 54 also increases the sealing pressure between the top surface 12 and the terminal portion 55 of the flange.

For each use, a new set of the liners 48–51 is placed on each tray 35. The various food products are then dished into the liners 48–51. The trays 35 are stacked so that each tray is covered by the tray above in the stack. The bead shaped flanges 54 on the liners 48–51 are compressed by the sealing surfaces 47 on the tray above so that the liners are effectively sealed against loss of moisture and transfer of heat, into or out of the liners.

After each use, the liners 48–51 are discarded. In this way, it is an easy matter to clean the trays 35 for reuse.

Figure 13:
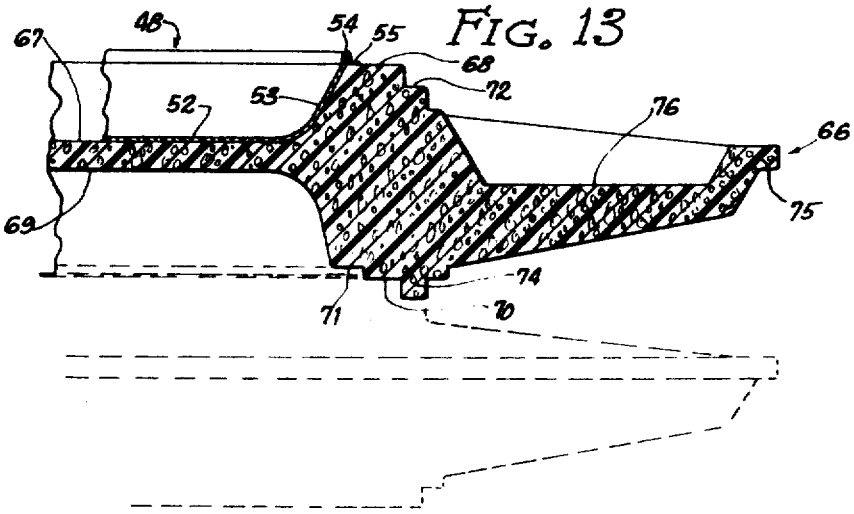
FIG. 13 is a fragmentary vertical section, showing another modified food tray made of plastic foam.

FIG. 13 illustrates another modified tray or device 66 for holding and serving food or the like. The tray 66 is similar to the tray 35 of FIGS. 6–12, except that the tray 66 is made entirely of insulating material, preferably in the form of resinous plastic foam. For example, the tray 66 may be made of polystyrene foam. The tray 66 may be molded in one piece from such foam material.

The shape of the illustrated tray 66 is substantially the same as the shape of the tray 35. Thus, the tray 66 is formed with one or more upwardly facing dished portions 67, adapted to hold food either directly or in auxiliary receptacles. As shown, the liners or dishes 48–51 are employed with the plastic foam tray 66. The cooperative relation between the liners and the tray 66 is the same as in the case of the tray 35. Thus, the illustrated liner 48 is closely received in the dished portion 67. The tray 66 has a top surface 68 which is adapted to be engaged by the outwardly projecting terminal flange 55 on the liner 48. The flange 55 forms a seal with the top surface 68.

The lower side of the tray 66 is formed with one or more inverted or complementary dished portions 69 which underlie the upwardly facing dished portions 67. When the trays 66 are stacked, the downwardly facing dished portions 69 afford room for the food in the corresponding dished portions 67 of the tray below.

As before, the lower side of the tray 66 is formed with a sealing surface 70, which underlies the sealing surface 68, and is adapted to engage the sealing surface 68 of the tray below, when the trays are stacked. The lower side of the tray 66 is formed with an additional sealing surface 71 which is adapted to engage the sealing flange 54 of the liner 48 in the tray below, when the trays are stacked. The sealing surfaces 70 and 71 correspond to the sealing surfaces 46 and 47 of the tray 35.

As before, the tray 66 is provided with nesting elements in the form of recesses 72 and flanges 74, corresponding to the recesses 43 and the flanges 44 of the tray 35. These nesting elements make it possible to stack the trays 66 in a stable manner. In addition, they provide improved heat insulation, and additional protection against the loss of moisture.

An outwardly projecting flange 75 extends around the border of the tray 66. The flange 75 is of reduced thickness and is adapted to be grasped when the tray is to be lifted. The flange 75 corresponds to the combined flanges 6 and 7 of the tray 35.

The tray 66 also has a dished portion 76 for holding table silver and other accessories. The dished portion 76 corresponds to the portion 15 of the tray 35.

The tray 66 of FIG. 13 is very low in cost, because it may be molded in one piece from plastic foam. Thus, it is economically feasible to treat the tray 66 as a single service item, to be discarded after a single use.

When plastic foam is molded, it normally forms a thin skin which is impervious to moisture. FIG. 13 represents this construction, in which the plastic foam has only this thin natural skin, which is sufficiently impervious and durable for a single service item, to be discarded after use.

Figure 14:
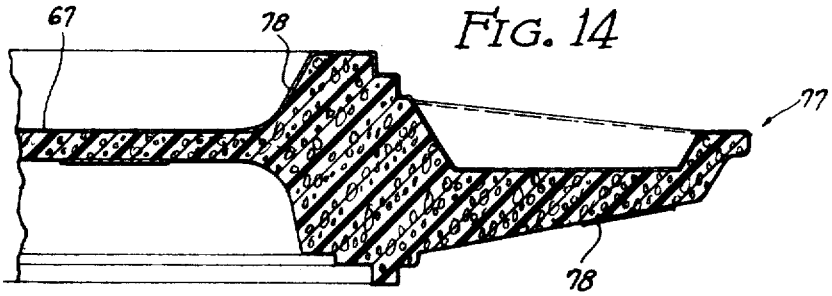
FIG. 14 is a vertical section showing still another modified tray, made of plastic foam with a coating or skin thereon.

FIG. 14 illustrates another modified tray 77, which is the same as the tray 66 except that an additional skin 78 has been applied to the plastic foam. The additional skin 78 makes the tray much more durable, so that it is suitable for reuse. Moreover, the tray 77 is more serviceable, even for a single use, because the added skin 78 affords greater resistance to penetration by the table silver.

To minimize the cost of the tray 77, the skin 78 may be applied to only the dished portions 67. However, it is preferred to apply the skin 78 to the entire upper side of the tray 77. For a still more attractive and serviceable product, the skin may be applied to the entire tray, so that both the upper and lower sides will be covered.

The skin 78 may be applied as a coating, made of a resinous plastic material. However, the skin 78 may also be applied as a thin film of resinous plastic sheet material, which is caused to adhere to the foam material of the tray 77. The adherence may be developed by the use of heat, a welding solvent, or a suitable adhesive. Heat may also be employed to form the plastic film so that it will conform closely to the shape of the tray 77.

In addition to being low in cost, the foam trays 66 and 77 are extremely light in weight. Moreover, the foam trays provide extremely efficient heat insulation.

The insulating effeciency of all of the illustrated trays is enhanced by the efficient distribution of the insulating material. Thus, for example, very little insulating material is provided between the bottom of the dished portion 8 and the top of the underlying dished portion 18. On the other hand, the maximum thickness of the insulating material is provided around the sides of the dished portions 8 and 18. When the trays are loaded and stacked, hot food is contained in all the dished portions 8, so that all of them are at the same elevated temperature. Inasmuch as there is no temperature gradient between the adjacent dished portions 8 in the stack, there is no need to provide any great amount of heat insulation therebetween. The heat insulation is concentrated around the sides of the dished portions, to prevent loss of heat to the surrounding atmosphere, and to the other dished portions, which may contain chilled foods.

The insulated trays of the present invention are capable of keeping a large number of complete meals in an appetizing condition for several hours. The hot foods are kept hot, while the cold foods are kept cold. Moreover, the stacked trays are easy to handle in large numbers.

Thus, the trays of the present invention are ideally suited for serving meals to airplane passengers. Moreover, the trays are equally applicable to the service of food in hospitals and other institutions.

Various other modifications, alternative constructions and equivalents may be employed without departing from the true spirit and scope of the invention, as exemplified in the foregoing description and defined in the following claims.

I claim:

1. An insulated food tray, comprising the combination of upper and lower cover members made of thin impervious sheet material, said upper cover member being superimposed upon said lower cover member, said upper and lower cover members having edge portions joined together, said upper and lower cover members having a space therebetween, and insulating material disposed in said space, said upper cover member being formed with at least one dished portion forming a receptacle for food or the like, said upper cover member having a nesting element extending around said dished portion, said lower cover member having a complementary nesting element underlying the nesting element of said upper cover member, whereby a plurality of said trays may be stacked with said nesting element of one tray in interlocking engagement with said complementary nesting element of the overlying tray so that said interlocked nesting elements form a seal around said dished portion.

2. A tray according to claim 1 in which one of said nesting elements comprises a groove while the other nesting element comprises a tongue, the tongue of one tray being adapted to interlock with the groove on the adjacent tray when a plurality of said trays are stacked.

3. A tray made of insulating material and having an upper surface relieved to define a plurality of dished receptacles adapted to receive food, said upper surface being also formed to define a first sealing surface facing upwardly and extending around each of said dished receptacles, the lower surface of said tray being formed to define a downwardly facing second sealing surface complementary to said first sealing surface and directly underlying it, whereby said tray is adapted to be stacked with other trays of like construction to define a food serving device in which the first sealing surface of any tray intermediate in the stack is in sealing engagement with the second sealing surface of the tray next above it in the stack, said tray and the one next above it cooperating thereby to define insulating enclosures completely surrounding said respective dished receptacles, operative to insulate the interior thereof from the ambient environment and from one another.

4. A tray as defined in claim 3 wherein the wall separating the bottom surfaces of said dished receptacles and the corresponding portions of the lower side of the tray are thinner and less insulatingly effective than the lateral walls separating the respective dished receptacles from one another, whereby a stack of such trays, when identically stocked with food portions, defines a food serving device in which the dished receptacles of the various trays form vertical columns characterized by like-temperature contents and insulated from one another by said lateral walls.

5. A tray according to claim 3 wherein at least one of the dished receptacles is provided with a thin impervious liner removably disposed therewithin.

6. A tray according to claim 5 in which said liner is provided with an upper edge portion having a bead-shaped upper flange adapted to sealingly engage the second sealing surface of a like tray stacked above it.

[7. A food tray formed at least in part of insulating material and having upper and lower surfaces, said upper surface being formed to define at least one dished receptacle provided with an upper sealing element disposed entirely therearound, said receptacle being adapted to receive food, said lower surface being formed to define a complementary sealing element directly underlying and dimensioned to register with said upper sealing element, said structural features enabling a plurality of said trays to be stacked vertically with the upper sealing element of each intermediate tray in said stack cooperating with the complementary sealing element of the tray next above it to form an insulating enclosure having relatively thin bottom and top walls and relatively thick side walls wholly surrounding said dished receptacle of said first-mentioned tray.]

8. An insulated food service system comprising a multiplicity of stacked insulated trays, each tray having upper and lower surfaces, each upper surface of each tray being formed to define a plurality of dished receptacles for the reception of food portions, said lower surface of each tray being formed to define a plurality of inverted dished portions under and substantially coextensive with a corresponding dished receptacle formed in said upper surface to form a plurality of groups of vertically aligned compartments having thin, essentially non-insulating upper and lower walls and thicker insulating side walls, so that first food portions of a like temperature may be placed in one group of vertically aligned compartments and second food portions of a like different temperature may be placed in another group of said vertically aligned compartments, whereby a food portion in any intermediate one of said vertically aligned compartments has substantial insulation between it and food portions in adjacent compartments but substantially none between it and food portions in compartments above and below it.

9. A food service system as in claim 8 wherein the upper surfaces of each tray are provided with sealing elements engageable with the lower surface of the tray above it.

10. A food service system as in claim 8 wherein each of said dished receptacles has a depth sufficient to accommodate substantially the entire height of a food holding container placed therein.

*11. An insulated food service system comprising a multiplicity of stacked insulated trays, each upper surface of each tray being formed to define a plurality of dished receptacles for the reception of food portions, said lower surface of each tray being formed to define a plurality of inverted dished portions under and substantially coextensive with a corresponding dished portion formed in said upper surface to form groups of vertically aligned compartments, one group of said compartments having thin, essentially non-insulating upper and lower walls and thicker insulating side walls so that first food portions of a like temperature may be placed in said one group of vertically aligned compartments and second food portions of a like different temperature may be placed in another group of said vertically aligned compartments whereby a food portion in any intermediate one of said group of vertically aligned compartment has substantial insulation between it and food portions in adjacent compartments but substantially none between it and food portions in compartments above and below it.*

* * * * *

UNITED STATES PATENT OFFICE

CERTIFICATE OF CORRECTION

Patent No. RE. 30,962 Dated June 8, 1982

Inventor(s) John A. Bridges

It is certified that error appears in the above-identified patent and that said Letters Patent are hereby corrected as shown below:

Col. 5, line 52, change "6-q2" to -- 6-12 -- .

Signed and Sealed this

Seventh Day of December 1982

[SEAL]

Attest:

GERALD J. MOSSINGHOFF

Attesting Officer Commissioner of Patents and Trademarks